US012574758B2

(12) United States Patent
Wu et al.

(10) Patent No.: US 12,574,758 B2
(45) Date of Patent: Mar. 10, 2026

(54) METHOD AND SYSTEM IN WIRELESS COMMUNICATION FOR DETERMINING QCL PARAMETER TO RECEIVE A REFEENCE SIGNAL

(71) Applicant: Apogee Networks, LLC, Dallas, TX (US)

(72) Inventors: Lu Wu, Shanghai (CN); Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 361 days.

(21) Appl. No.: 17/849,683

(22) Filed: Jun. 26, 2022

(65) Prior Publication Data

US 2022/0330043 A1 Oct. 13, 2022

Related U.S. Application Data

(63) Continuation of application No. PCT/CN2020/129979, filed on Nov. 19, 2020.

(30) Foreign Application Priority Data

Dec. 27, 2019 (CN) .......................... 201911378409.6

(51) Int. Cl.
*H04W 16/28* (2009.01)
*H04L 5/00* (2006.01)
(Continued)

(52) U.S. Cl.
CPC ........... *H04W 16/28* (2013.01); *H04L 5/0051* (2013.01); *H04W 72/0446* (2013.01); *H04W 72/0453* (2013.01)

(58) Field of Classification Search
CPC ........ H04B 7/00; H04B 7/06; H04B 7/06968; H04B 7/0452; H04B 17/318; H04B 7/024;
(Continued)

(56) References Cited

U.S. PATENT DOCUMENTS

2013/0044820 A1* 2/2013 Haimi-Cohen et al. ....................
375/240.24
2015/0257173 A1* 9/2015 You ........................ H04L 1/1864
370/330
(Continued)

FOREIGN PATENT DOCUMENTS

CN 108632008 A * 10/2008
CN 109787663 A * 5/2019
(Continued)

OTHER PUBLICATIONS

CN201911378409.6 Notification to Grant Patent Right for Invention dated May 5, 2022.
(Continued)

*Primary Examiner* — Jean A Gelin
(74) *Attorney, Agent, or Firm* — Volpe Koenig

(57) ABSTRACT

The present application provides a method and device in a node used for wireless communications. A first node receives a first information block and a second information block; receives a first reference signal; and receives a first signal. The first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, and the first index is used
(Continued)

When target index is the same as first index

When target index is different from first index to determine whether a QCL parameter for receiving the first reference signal is related to a QCL parameter for receiving the first signal.

20 Claims, 6 Drawing Sheets

(51) Int. Cl.
*H04W 72/0446* (2023.01)
*H04W 72/0453* (2023.01)

(58) Field of Classification Search
CPC .......... H04B 7/0413; H04B 7/02; H04L 5/00; H04L 27/26; H04L 5/0035; H04L 5/0044; H04L 27/261; H04L 5/0051; H04L 5/0023; H04L 5/0094; H04L 27/2602; H04L 5/0048; H04W 24/04; H04W 72/04; H04W 72/08; H04W 76/27; H04W 72/0406; H04W 24/08; H04W 72/12; H04W 72/232; H04W 72/231; H04W 72/20; H04W 72/121; H04W 74/00; H04W 74/002; H04W 76/16; H04W 76/00; H04W 76/10; H04W 76/11; H04W 88/00; H04W 88/08; H04W 88/02; H04W 16/28; H04W 72/0446; H04W 72/0453; H04W 56/0015; H04W 88/18
See application file for complete search history.

(56) References Cited

U.S. PATENT DOCUMENTS

| | | | | |
|---|---|---|---|---|
| 2018/0324798 A1 * | 11/2018 | Zhang | ............... | H04W 72/0446 |
| 2019/0335427 A1 * | 10/2019 | Sun | ........................ | H04W 24/10 |
| 2019/0364617 A1 * | 11/2019 | Wu et al. | .............. | H04W 92/10 |
| 2020/0014455 A1 * | 1/2020 | Gao et al. | ............ | H04B 7/0857 |
| 2020/0127723 A1 * | 4/2020 | Kang | ...................... | H04J 13/16 |
| 2020/0205153 A1 * | 6/2020 | Zhang et al. | ..... | H04W 72/0446 |
| 2020/0288453 A1 | 9/2020 | Zhang | | |
| 2020/0304218 A1 * | 9/2020 | Gao et al. | ............ | H04B 17/318 |
| 2021/0111779 A1 * | 4/2021 | Kundargi et al. | .... | H04B 7/0695 |
| 2021/0258940 A1 * | 8/2021 | Kim | ...................... | H04L 5/0094 |

FOREIGN PATENT DOCUMENTS

| | | | | | |
|---|---|---|---|---|---|
| CN | 110535592 A | | 12/2019 | | |
| CN | 112398619 A | * | 2/2021 | ........... | H04L 5/0053 |
| WO | WO 2016159673 A1 | * | 10/2016 | | |
| WO | WO 2018171793 A1 | * | 9/2018 | | |
| WO | 2019097478 A1 | | 5/2019 | | |
| WO | WO 2019096248 A1 | * | 5/2019 | | |
| WO | WO 2019174489 A1 | * | 9/2019 | | |
| WO | WO 2019214537 A1 | * | 11/2019 | | |

OTHER PUBLICATIONS

CN201911378409.6 First Search Report dated Nov. 25, 2021.
Huawei "RAN 2 Specification impacts of multi-TRIP transmission" 3GPP TSG RAN WG2 RL2 R2-1913619,Oct. 4, 2019.
NOKIA. "Introduction ofNR enhanced MIMO" RI-1913655 3GPP TSG-RAN Wg 1 Meeting #99, Reno, USA, Nov. 22, 2019.
3rd Generation Partnership Project; Technical Specification Group Radio Access Network; NR;Physical layer procedures for data (Release 15) 3GPP TS 38.214 V15.7.0 Sep. 25, 2019.
First Office Action received in application No. EP20907680.1 dated May 30, 2023.
First Office Action received in application No. IN202217040125 dated Mar. 23, 2023.
First Office Action of Chinese patent application No. CN202210796047.8 dated Jan. 12, 2024.
First Search Report of Chinese patent application No. CN202210796047.8 dated Jan. 8, 2024.
ZTE "Maintenance for beam management" 3GPP TSG RAN WG1 Meeting #94bis R1-1810214 Sep. 29, 2018.
LG Electronics "Remaining issues on downlink control channel" 3GPP TSG RAN WG1 Meeting #94bis R1-1810256 Sep. 29, 2018.
Third Generation Partnership Project, "Technical Specification Group Radio Access Network; NR; Physical channels and modulation (Release 15)," 3GPP TS 38.211 V15.7.0 (Sep. 2019).
Third Generation Partnership Project, "Technical Specification Group Radio Access Network; NR; Multiplexing and channel coding (Release 15)," 3GPP TS 38.212 V15.7.0 (Sep. 2019).
Third Generation Partnership Project, "Technical Specification Group Radio Access Network; NR; Medium Access Control (MAC) protocol specification (Release 15)," 3GPP TS 38.321 V15.7.0 (Sep. 2019).
Third Generation Partnership Project, "Technical Specification Group Radio Access Network; NR; Radio Resource Control (RRC) protocol specification (Release 15)," 3GPP TS 38.331 V15.7.0 (Sep. 2019).

* cited by examiner

100

First node

Receiving first information block and second information block

— 101

Receiving first reference signal

— 102

Receiving first signal

— 103

| N04. Second node | | U03. First node |
|---|---|---|

S30.transmitting fourth information block

←————fourth information block————

S40.receiving fourth information block

S41.transmitting first information block and second information block first information block and
second information block ————→

S31.receiving first information block and second information block

S42.transmitting first reference signal

————————first reference signal————————→

S32.receiving first reference signal

S43.transmitting first signal

————————first signal————————→

S33.receiving first signal

S44.transmitting M-1 signal(s)

————————M-1 signal(s)————————→

S34.receiving M-1 signal(s)

**F2
Optional**

End     End

FIG. 6

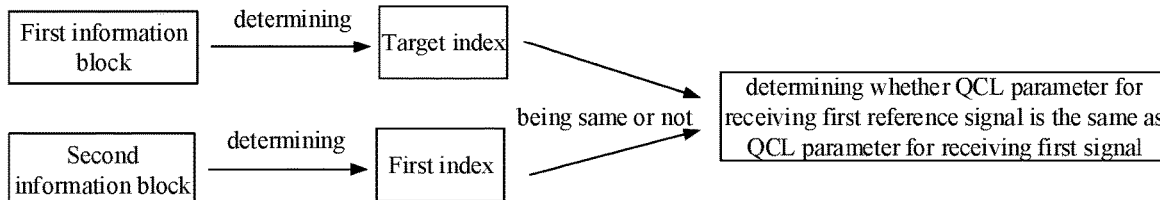

FIG. 7

When target index is the same as first index

When target index is different from first index

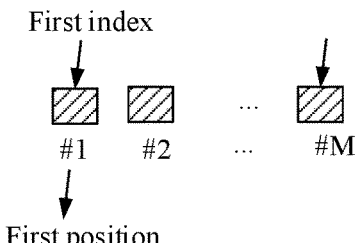
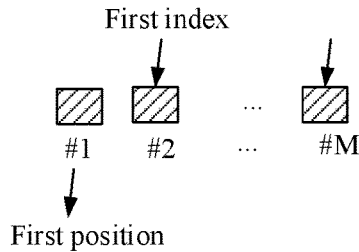
(a) A QCL parameter for receiving first reference signal is related to a QCL parameter for receiving first signal
(b) A QCL parameter for receiving first reference signal is unrelated to a QCL parameter for receiving first signal
FIG. 11
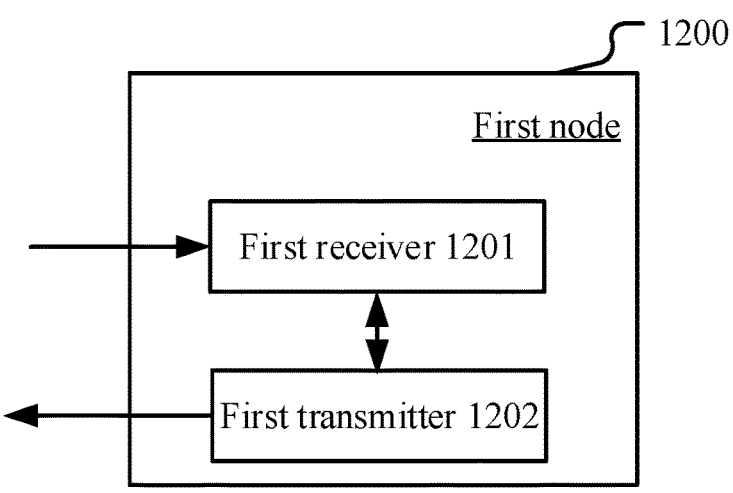
FIG. 12
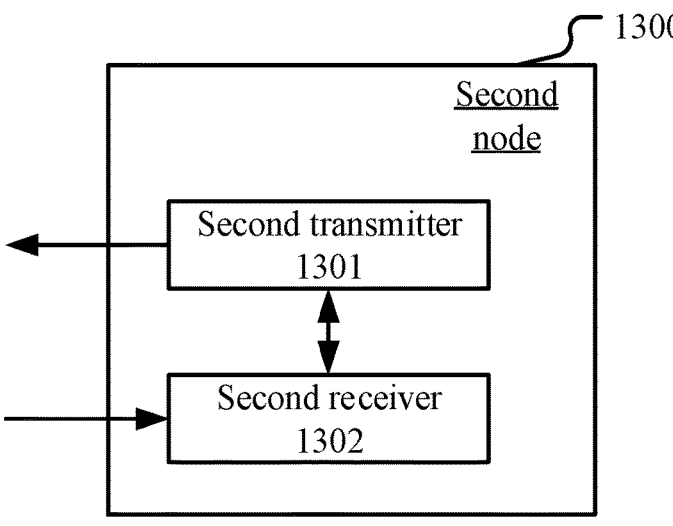
FIG. 13

METHOD AND SYSTEM IN WIRELESS COMMUNICATION FOR DETERMINING QCL PARAMETER TO RECEIVE A REFEENCE SIGNAL

CROSS REFERENCE TO RELATED APPLICATIONS

This application is the continuation of International patent application PCT/CN2020/129979, filed on Nov. 19, 2020, which claims the priority benefit of Chinese Patent Application No. 201911378409.6, filed on Dec. 27, 2019, the full disclosure of which is incorporated herein by reference.

BACKGROUND

Technical Field

The present application relates to transmission methods and devices in wireless communication systems, and in particular to a transmission method and device of a radio signal in a wireless communication system supporting cellular networks.

Related Art

NR Rel-16 standard can support transmissions of multiple Transmit-Receive Points (TRPs) or antenna panels, and has supported that a DCI schedules transmissions of multiple TRPs or antenna panels as well as that multiple DCIs respectively schedule transmissions of multiple TRPs or antenna panels. Taking the case of multiple TRPs or antenna panels into account, when a symbol where an aperiodic reference signal (such as Channel State Information-Reference Signal (CSI-RS)) is located is occupied by another downlink signal at the same time, how to determine a QCL parameter for receiving the aperiodic reference signal is a key problem to be solved.

SUMMARY

In NR Rel-15 standard, when a symbol where an aperiodic CSI-RS is located is occupied by another downlink signal (such as a Physical Downlink Shared CHannel (PDSCH), a periodic/semi-persistent/aperiodic CSI-RS), and under certain conditions, a QCL parameter for receiving the aperiodic CSI-RS is related to a QCL parameter for receiving another signal. Taking transmissions in the case of multiple TRPs or antenna panels into account, how to determine a QCL parameter for receiving an aperiodic reference signal is a key problem to be solved.

To address the above problem, the present application provides a solution. In description of the above problem, downlink is illustrated as an example; the present application is also applicable to transmission scenarios of downlink and sidelink, where similar technical effects can be achieved. Additionally, the adoption of a unified solution for various scenarios (including but not limited to downlink, uplink and sidelink) contributes to the reduction of hardcore complexity and costs. It should be noted that the embodiments in a User Equipment (UE) in the present application and characteristics of the embodiments may be applied to a base station if no conflict is incurred, and vice versa. And the embodiments in the present application and the characteristics in the embodiments can be arbitrarily combined if there is no conflict.

In one embodiment, for interpretations of the terminology in the present application, refer to definitions given in the 3GPP TS36 series.

In one embodiment, for interpretations of the terminology in the present application, refer to definitions given in the 3GPP TS38 series.

In one embodiment, for interpretations of the terminology in the present application, refer to definitions given in the 3GPP TS37 series.

In one embodiment, for interpretations of the terminology in the present application, refer to definitions given in Institute of Electrical and Electronics Engineers (IEEE) protocol specifications.

The present application provides a method in a first node for wireless communications, comprising:

receiving a first information block and a second information block;

receiving a first reference signal; and receiving a first signal;

herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one embodiment, a problem to be solved in the present application is: when a symbol where a reference signal is located is occupied by another signal at the same time, how to determine a QCL parameter for receiving the reference signal is a key problem to be solved.

In one embodiment, a problem to be solved in the present application is: when a symbol where a reference signal is located is occupied by another signal at the same time, whether a QCL parameter for receiving the reference signal is related to a QCL parameter for receiving another signal is a key problem to be solved.

In one embodiment, a problem to be solved in the present application is: taking transmissions in case of multiple TRPs or antenna panels into account, when a symbol where an aperiodic CSI-RS is located is occupied by another downlink signal (such as PDSCH, periodic/semi-persistent/aperiodic CSI-RS), and a time interval between a triggering signaling and a CSI-RS is less than a beamSwitchTiming (for definition, refer to section 5.2.1 in 3GPP TS38.214), whether a QCL parameter for receiving the aperiodic CSI-RS is related to a QCL parameter for receiving another signal.

In one embodiment, the above method is essential in that a first index is a CORESETPoolIndex, and for definition of the CORESETPoolIndex, refer to section 6.3.2 in 3GPP TS38.331, a transmission TRP or a transmission antenna panel of a first signal is identified according to a first index, whether a QCL parameter for receiving the first reference signal is related to a QCL parameter for receiving the first signal is determined according to whether a first information block and a second information block come from a same TRP or an antenna panel. Advantages of adopting the above method is in that it can prevent receiving beams of multiple signals simultaneously transmitted on a same TRP or antenna panel from conflicting, thus ensuring that the plurality of signals simultaneously transmitted on the same TRP or antenna panel can be received at the same time.

According to one aspect of the present application, the above method is characterized in comprising:

receiving M−1 signal(s);

herein, the first signal is any of M signals, the M−1 signal(s) is(are) signal(s) other than the first signal in the M signals, M being a positive integer greater than 1; there exists a same multi-carrier symbol belonging to time-domain resources occupied by the first reference signal and time-domain resources occupied by each of the M signals.

In one embodiment, the above method is essential in that M signals are signals respectively transmitted by M TRPs or M antenna panels.

According to one aspect of the present application, the above method is characterized in comprising:

receiving M−1 information block(s);

herein, M information blocks comprise the M−1 information block(s) and the second information block, and the M information blocks are respectively used to determine the M signals.

In one embodiment, the above method is essential in that M information blocks are respectively M signalings.

According to one aspect of the present application, the method is characterized in that the first information block is used to determine a target index, and the target index is a non-negative integer; whether the target index is the same as the first index is used to determine whether the QCL parameter for receiving the first reference signal is related to the QCL parameter for receiving the first signal.

In one embodiment, the above method is essential in that a target index and a first index are respectively a CORE-SETPoolIndex to which a CORESET transmitting a first information block and a second information block belongs, and a transmission TRP or a transmission antenna panel of a first reference signal and a first signal are respectively identified according to a target index and a first index; when a target index and a first index are the same, a first reference signal and a first signal come from a same TRP or antenna panel; when a target index and a first index are different, a first reference signal and a first signal come from different TRPs or antenna panels.

According to one aspect of the present application, the above method is characterized in comprising:

receiving a third information block;

herein, the third information block is used to indicate N time-frequency resource groups, and each of the N time-frequency resource groups corresponds to an index in a first index set; time-frequency resources occupied by the second information block belong to a first time-frequency resource group in the N time-frequency resource groups, and the first index is an index corresponding to the first time-frequency resource group in the first index set; time-frequency resources occupied by the first information block belong to a target time-frequency resource group in the N time-frequency resource groups, and the target index is an index corresponding to the target time-frequency resource group in the first index set; N is a positive integer greater than 1, the first time-frequency resource group is one of the N time-frequency resource groups, the target time-frequency resource group is one of the N time-frequency resource groups, the first index set comprises multiple indexes, and any index in the first index set is a non-negative integer.

According to one aspect of the present application, the method is characterized in that the second information block is used to indicate the M signals; M indexes respectively indicate QCL parameters for receiving the M signals, and the first index is one of the M indexes; a position of the first index in the M indexes is used to determine whether the QCL parameter for receiving the first reference signal is related to the QCL parameter for receiving the first signal.

In one embodiment, the above method is essential in that M signals come from different TRPs or antenna panels, M indexes respectively indicate M TCI states, and the M TCI states respectively indicate QCL parameters of M signals, the QCL parameters for receiving the first reference signal are related to a QCL parameter corresponding to one of the M TCI states at a specific position. The advantage of adopting the above method is in simplifying the system design.

According to one aspect of the present application, the above method is characterized in comprising:

transmitting a fourth information block;

herein, the fourth information block is used to determine the first reference interval.

The present application provides a method in a second node for wireless communications, comprising:

transmitting a first information block and a second information block;

transmitting a first reference signal; and transmitting a first signal;

herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

According to one aspect of the present application, the above method is characterized in comprising:

transmitting M−1 signal(s);

herein, the first signal is any of M signals, the M−1 signal(s) is(are) signal(s) other than the first signal in the M signals, M being a positive integer greater than 1; there exists a same multi-carrier symbol belonging to time-domain resources occupied by the first reference signal and time-domain resources occupied by each of the M signals.

According to one aspect of the present application, the above method is characterized in comprising:

transmitting M−1 information block(s);

herein, M information blocks comprise the M−1 information block(s) and the second information block, and the M information blocks are respectively used to determine the M signals.

According to one aspect of the present application, the method is characterized in that the first information block is used to determine a target index, and the target index is a non-negative integer; whether the target index is the same as the first index is used to determine whether the QCL parameter for receiving the first reference signal is related to the QCL parameter for receiving the first signal.

According to one aspect of the present application, the above method is characterized in comprising:

transmitting a third information block;

herein, the third information block is used to indicate N time-frequency resource groups, and each of the N time-frequency resource groups corresponds to an index in a first index set; time-frequency resources occupied by the second information block belong to a first time-frequency resource group in the N time-frequency resource groups, and the first index is an index corresponding to the first time-frequency resource group in the first index set; time-frequency resources occupied by the first information block belong to a target time-frequency resource group in the N time-frequency resource groups, and the target index is an index corresponding to the target time-frequency resource group in the first index set; N is a positive integer greater than 1, the first time-frequency resource group is one of the N time-frequency resource groups, the target time-frequency resource group is one of the N time-frequency resource groups, the first index set comprises multiple indexes, and any index in the first index set is a non-negative integer.

According to one aspect of the present application, the method is characterized in that the second information block is used to indicate the M signals; M indexes respectively indicate QCL parameters for receiving the M signals, and the first index is one of the M indexes; a position of the first index in the M indexes is used to determine whether the QCL parameter for receiving the first reference signal is related to the QCL parameter for receiving the first signal.

According to one aspect of the present application, the above method is characterized in comprising:

receiving a fourth information block;

herein, the fourth information block is used to determine the first reference interval.

The present application provides a first node for wireless communication, comprising:

a first receiver, receiving a first information block and a second information block; receiving a first reference signal; and receiving a first signal;

herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

The present application provides a second node for wireless communications, comprising:

a second transmitter, transmitting a first information block and a second information block;

transmitting a first reference signal; and transmitting a first signal;

herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one embodiment, the method in the present application is advantageous in the following aspects:

in the case of multiple TRPs or multiple antenna panels, the present application proposes a scheme to determine a QCL parameter for receiving the reference signal when a symbol where a reference signal is located is occupied by another signal at the same time;

in the case of multiple TRPs or multiple antenna panels, the present application proposes a scheme to determine whether a QCL parameter for receiving the reference signal is related to a QCL parameter for receiving another signal when a symbol where a reference signal is located is occupied by another signal at the same time;

in the case of multiple TRPs or multiple antenna panels, the present application proposes when a symbol where an aperiodic CSI-RS is located is occupied by another downlink signal (such as a PDSCH, a periodic/semi-persistent/aperiodic CSI-RS), and a time interval between a triggering signaling and a CSI-RS is less than a beamSwitchTiming (for definition, refer to section 5.2.1 of 3GPP TS38.214), a scheme for determining whether a QCL parameter for receiving the aperiodic CSI-RS is related to a QCL parameter for receiving another signal;

the method proposed in the present application can prevent receiving beams of multiple signals simultaneously transmitted on a same TRP or antenna panel from conflicting, thus ensuring that the plurality of signals simultaneously transmitted on the same TRP or antenna panel can be received at the same time.

BRIEF DESCRIPTION OF THE DRAWINGS

Other features, objects and advantages of the present application will become more apparent from the detailed description of non-restrictive embodiments taken in conjunction with the following drawings:

FIG. 6 illustrates a flowchart of radio signal transmission according to another embodiment of the present application;

FIG. 7 illustrates a schematic diagram of a relation between a first index and a QCL parameter for receiving a first reference signal according to one embodiment of the present application;

FIG. 11 illustrates a schematic diagram of a relation between a position of a first index in M indexes and a QCL parameter for receiving a first reference signal according to one embodiment of the present application;

FIG. 12 illustrates a structure block diagram of a processing device in a first node according to one embodiment of the present application;

FIG. 13 illustrates a structure block diagram of a processing device in second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figures 1, 2:
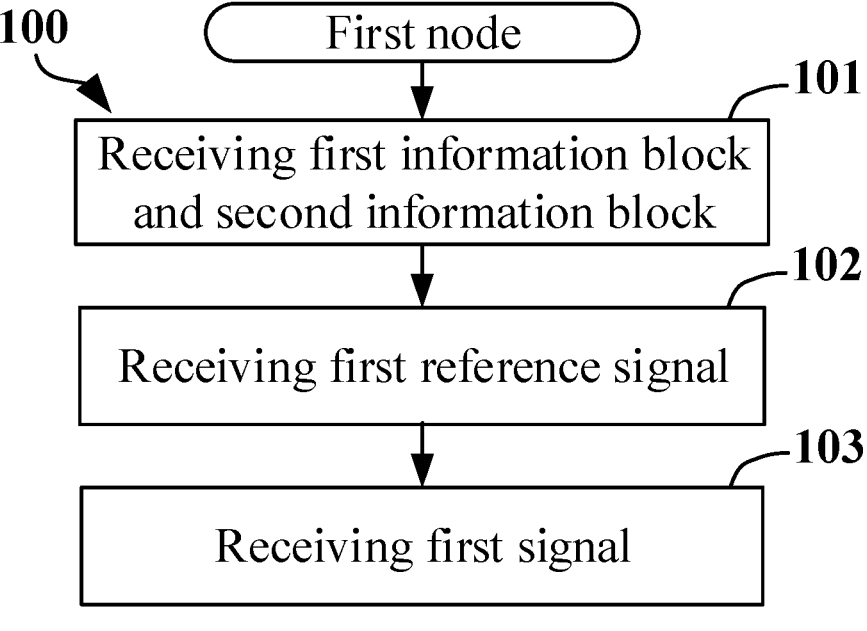
FIG. 1 illustrates a flowchart of a first information block, a second information block, a first reference signal and a first signal according to one embodiment of the present application.
FIG. 2 illustrates a schematic diagram of a network architecture according to one embodiment of the present application.

Embodiment 1 illustrates a flowchart of a first information block, a second information block, a first reference signal and a first signal according to one embodiment of the present application, as shown in FIG. 1. In FIG. 1, each box represents a step. Particularly, the sequential order of steps in these boxes does not necessarily mean that the steps are chronologically arranged.

In embodiment 1, the first node in the present application receives a first information block and a second information block in step 101; receives a first reference signal in step 102; receives a first signal in step 103; herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one embodiment, the first information block is dynamically configured.

In one embodiment, the first information block is carried by a physical-layer signaling.

In one embodiment, the first information block is carried by a Downlink Control Information (DCI) signaling.

In one embodiment, the first information block is transmitted on a downlink physical-layer control channel.

In one embodiment, the first information block and the second information block are carried by a same signaling.

In one embodiment, the first information block and the second information block are carried by a same DCI signaling.

In one embodiment, the first information block and the second information block are carried by different signalings.

In one embodiment, the first information block and the second information block are carried by different DCI signalings.

In one embodiment, the first information block is carried by a DCI signaling, and the second information block is carried by an RRC signaling.

In one embodiment, the second information block is dynamically configured.

In one embodiment, the second information block is carried by a physical layer signaling.

In one embodiment, the second information block is carried by a DCI signaling.

In one embodiment, the second information block is transmitted on a downlink physical-layer control channel.

In one embodiment, the second information block is semi-statically configured.

In one embodiment, the second information block is carried by a higher-layer signaling.

In one embodiment, the second information block is carried by an RRC signaling.

In one embodiment, the second information block is carried by a MAC CE signaling.

In one embodiment, the second information comprises one or multiple Information Elements (IEs) in an RRC signaling.

In one embodiment, the second information block comprises all or partial an IE in an RRC signaling.

In one embodiment, the second information block comprises partial fields of an IE in an RRC signaling.

In one embodiment, the second information block comprises multiple IEs in an RRC signaling.

In one embodiment, the second information block is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a Narrow Band PDSCH (NB-PDSCH).

In one embodiment, the downlink physical-layer control channel is a Physical Downlink Control CHannel (PDCCH).

In one embodiment, the downlink physical-layer control channel is an Enhanced PDCCH (EPDCCH).

In one embodiment, the downlink physical-layer control channel is a short PDCCH (sPDCCH).

In one embodiment, the downlink physical layer control channel is a Narrow Band PDCCH (NB-PDCCH).

In one embodiment, the first reference signal comprises a Channel State Information-Reference Signal (CSI-RS).

In one embodiment, the first reference signal comprises a Tracking Reference Signal (TRS).

In one embodiment, the first reference signal comprises an aperiodic CSI-RS.

In one embodiment, the first reference signal is aperiodic.

In one embodiment, the first reference signal comprises at least one CSI-RS.

In one embodiment, the first reference signal comprises at least one aperiodic CSI-RS.

In one embodiment, the first signal comprises data.

In one embodiment, the first signal carries a Transport Block (TB).

In one embodiment, the first signal carries at least one TB.

In one embodiment, the first signal comprises a PDSCH.

In one embodiment, data carried by the first signal is transmitted on a downlink physical layer data channel (i.e., a downlink channel capable of carrying physical layer data).

In one embodiment, a TB carried by the first signal is transmitted on a downlink physical layer data channel (i.e., a downlink channel capable of carrying physical layer data).

In one embodiment, the first signal comprises a reference signal.

In one embodiment, the first signal comprises a CSI-RS.

In one embodiment, the second information block is carried by an RRC signaling, and the first signal comprises a periodic CSI-RS.

In one embodiment, the second information block is carried by an RRC signaling, and the first signal comprises a semi-persistent CSI-RS.

In one embodiment, the second information block is carried by a DCI signaling, and the first signal comprises a semi-persistent CSI-RS.

In one embodiment, the second information block is carried by a DCI signaling, and the first signal comprises an aperiodic CSI-RS.

In one embodiment, the first reference signal and the first signal are non-orthogonal in time domain.

In one embodiment, the first reference signal and the first signal are overlapping in time domain.

In one embodiment, the first reference signal and the first signal comprise at least one same multi-carrier symbol in time domain.

In one embodiment, a multi-carrier symbol occupied by the first reference signal belongs to a multi-carrier symbol occupied by the first signal.

In one embodiment, both the first reference signal and the first signal belong to a first frequency band in frequency domain.

In one subembodiment of the above embodiment, the first frequency band comprises a group of continuous subcarriers.

In one subembodiment of the above embodiment, the first frequency band comprises a Band-Width Part (BWP).

In one subembodiment of the above embodiment, the first frequency band comprises a Carrier.

In one embodiment, a time offset between a time unit to which the first reference signal belongs and a time unit to which the first information block belongs is configured by an RRC signaling.

In one embodiment, a time offset between a time unit to which the first reference signal belongs and a time unit to which the first information block belongs is configured by an NZP-CSI-RS-Resource Set IE.

In one embodiment, a time offset between a time unit to which the first reference signal belongs and a time unit to which the first information block belongs is an aperiodic-TriggeringOffset, and for the specific definition of the aperiodicTriggeringOffset, refer to section 5.2.1.5 in 3GPP TS 38.214.

In one embodiment, a time offset between two time units is an absolute value of a difference value between indexes of the two time units.

In one embodiment, a time offset between two time units is a time interval between the two time units.

In one embodiment, a time offset between two time units is a time interval between start times of the two time units.

In one embodiment, the time unit comprises at least one multi-carrier symbol.

In one embodiment, the time unit comprises a slot.

In one embodiment, the time unit comprises a subframe.

In one embodiment, the multi-carrier symbol is an Orthogonal Frequency-Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multi-Carrier (FBMC) symbol.

In one embodiment, the first information block explicitly indicates the first reference signal.

In one embodiment, the first information block implicitly indicates the first reference signal.

In one embodiment, the first information block indicates an index of the first reference signal.

In one embodiment, the first information block comprises a CSI request field, and for the specific definition of the CSI request field, refer to section 7.3.1.1 in 3GPP TS38.212.

In one embodiment, the first information block is used to determine a first CSI triggering state out of N1 Channel State Information (CSI) triggering states, and the first reference signal is associated with the first CSI triggering state; N1 is a positive integer greater than 1.

In one subembodiment of the above embodiment, any of the N1 CSI triggering states is a CSI triggering state, and for the specific definition of the CSI triggering state, refer to section 5.2.1.5 in 3GPP TS38.214.

In one subembodiment of the above embodiment, the first information block indicates an index of the first CSI triggering state in the N1 CSI triggering states.

In one subembodiment of the above embodiment, the N1 CSI triggering states are configured by a CSI-Aperiodic-TriggerStateList IE.

In one subembodiment of the above embodiment, an association between the first reference signal and the first CSI trigger state is configured by an RRC signaling.

In one subembodiment of the above embodiment, an association between the first reference signal and the first CSI trigger state is configured by a CSI-AperiodicTrigger-StateList IE.

In one subembodiment of the above embodiment, a first CSI reporting configuration is associated with the first triggering state, and the fifth information block is a CSI corresponding to the first CSI reporting configuration generated for a measurement performed on the first reference signal.

In one embodiment, the first information block is used to determine configuration information of the first reference signal.

In one embodiment, the first information block is used to indicate configuration information of the first reference signal.

In one embodiment, the first information block explicitly indicates configuration information of the first reference signal.

In one embodiment, the first information block implicitly indicates configuration information of the first reference signal.

In one embodiment, configuration information of the first reference signal is indicated by an RRC signaling.

In one embodiment, configuration information of the first reference signal comprises at least one of a period, a time offset, occupied time-domain resources, occupied frequency-domain resources, occupied code-domain resources, a cyclic shift, an Orthogonal Cover Code (OCC), an occupied antenna port group, a transmitting sequence or a Transmission Configuration Indicator (TCI) state.

In one embodiment, the occupied time-domain resources comprise at least one multicarrier symbol.

In one embodiment, the occupied frequency-domain resources comprise at least one subcarrier.

In one embodiment, the occupied frequency-domain resources comprise at least one RB.

In one embodiment, the occupied time-frequency resources comprise at least one RE.

In one embodiment, the first reference interval is beam-SwitchTiming, and for the specific definition of the beam-SwitchTiming, refer to section 5.2.1 in 3GPP TS 38.214.

In one embodiment, the first reference interval is measured by slot.

In one embodiment, the first reference interval is measured by subframe.

In one embodiment, the first reference interval is measured by multicarrier symbol.

In one embodiment, the first reference interval is one of 14, 28 and 48.

In one embodiment, the first reference interval is reported by the first node to a transmitter of the first reference signal.

In one embodiment, the first reference interval belongs to a capability reporting of the first node.

In one embodiment, a time interval between the first information block and the first reference signal is a time offset between a last multi-carrier symbol of a downlink physical-layer control channel carrying the first information block and a starting multi-carrier symbol of the first reference signal.

In one embodiment, a time interval between the first information block and the first reference signal is a time offset between a last multi-carrier symbol of a PDCCH carrying the first information block and a starting multi-carrier symbol of the first reference signal.

In one embodiment, a time offset between two multi-carrier symbols is an absolute value of a difference value between indexes of the two multi-carrier symbols.

In one embodiment, a time offset between two multi-carrier symbols is a time interval between the two multi-carrier symbols.

In one embodiment, a time offset between two multi-carrier symbols is a time interval between starting times of the two multi-carrier symbols.

In one embodiment, the second information block is carried by a DCI signaling, a time interval between the second information block and the first signal is less than a second reference interval, and the second reference interval is a positive integer.

In one embodiment, the second information block is carried by a DCI signaling, a time interval between the second information block and the first signal is not less than a second reference interval, and the second reference interval is a positive integer.

In one embodiment, the first signal comprises a PDSCH, the second reference interval is timeDurationForQCL, and for the specific definition of the timeDurationForQCL, refer to section 5.1.5 of 3GPP TS38.214.

In one embodiment, the first signal comprises a CSI-RS, and the second reference interval is the same as the first reference interval.

In one embodiment, the second reference interval is measured by slot.

In one embodiment, the second reference interval is measured by subframe.

In one embodiment, the second reference interval is measured by multicarrier symbol.

In one embodiment, the second reference interval is reported by the first node to a transmitter of the first signal.

In one embodiment, the second reference interval is based on a reported capability of the first node.

In one embodiment, a time interval between the second information block and the first signal is a time offset between a last multi-carrier symbol of a downlink physical-layer control channel carrying the second information block and a starting multi-carrier symbol of the first signal.

In one embodiment, a time interval between the second information block and the first signal is a time offset between a last multi-carrier symbol of a PDCCH carrying the second information block and a starting multi-carrier symbol of the first signal.

In one embodiment, the first signal comprises an aperiodic CSI-RS, and the second information is used to trigger a transmission of the first signal.

In one subembodiment of the above embodiment, configuration information of the first signal is configured by an RRC signaling.

In one embodiment, the first signal comprises data, and the second information block is used to indicate scheduling information of the first signal.

In one embodiment, the first signal comprises data, and the second information block explicitly indicates scheduling information of the first signal.

In one embodiment, the first signal comprises data, and the second information block implicitly indicates scheduling information of the first signal.

In one embodiment, the first signal comprises a CSI-RS, and configuration information of the first signal comprises at least one of a period, a time offset, occupied time-domain resources, occupied frequency-domain resources, occupied code-domain resources, a cyclic shift, an Orthogonal Cover Code, an occupied antenna port group, a transmitting sequence or a TCI state.

In one embodiment, the first signal comprises data, and scheduling information of the first signal comprises at least one of occupied time-domain resources, occupied frequency-domain resources, a Modulation and Coding Scheme (MCS), configuration information of DeModulation Reference Signals (DMRS), a Hybrid Automatic Repeat request (HARQ) process number, a Redundancy Version (RV), a New Data Indicator (NDI), a Downlink Assignment Index (DAT), a transmitting antenna port or a TCI state.

In one embodiment, a type of the QCL parameter of the first reference signal is QCL-TypeD, and for the specific definition of the QCL-TypeD, refer to section 5.1.5 in 3GPP TS38.214.

In one embodiment, the QCL parameter of the first reference signal comprises a spatial RX parameter.

In one embodiment, the QCL parameter of the first reference signal comprises a QCL assumption for receiving the first reference signal.

In one embodiment, a type of the QCL parameter of the first signal is QCL-TypeD, and for the specific definition of the QCL-TypeD, refer to section 5.1.5 in 3GPP TS38.214.

In one embodiment, the QCL parameter of the first signal comprises a spatial RX parameter.

In one embodiment, the QCL parameter of the first signal comprises a QCL assumption receiving the first reference signal.

In one embodiment, the meaning of "a QCL parameter for receiving the first reference signal being related to a QCL parameter for receiving the first signal" comprises: a QCL parameter for receiving the first reference signal is the same as a QCL parameter for receiving the first signal.

In one embodiment, the meaning of "a QCL parameter for receiving the first reference signal being unrelated to a QCL parameter for receiving the first signal" comprises: a QCL parameter for receiving the first reference signal is different from a QCL parameter for receiving the first signal.

In one embodiment, the meaning of "a QCL parameter for receiving the first reference signal being related to a QCL parameter for receiving the first signal" comprises: a QCL parameter for receiving the first signal is used to determine a QCL parameter for receiving the first reference signal.

In one embodiment, the meaning of "a QCL parameter for receiving the first reference signal being unrelated to a QCL parameter for receiving the first signal" comprises: a QCL parameter for receiving the first signal is not used to determine a QCL parameter for receiving the first reference signal.

In one embodiment, the meaning of "a QCL parameter for receiving the first reference signal being related to a QCL parameter for receiving the first signal" comprises: a QCL parameters for receiving the first reference signal can be inferred from a QCL parameter for receiving the first signal.

In one embodiment, the meaning of "a QCL parameter for receiving the first reference signal being unrelated to a QCL parameter for receiving the first signal" comprises: a QCL parameters for receiving the first reference signal cannot be inferred from a QCL parameter for receiving the first signal.

Embodiment 2

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 241 corresponds to the first node in the present application.

In one embodiment, the gNB 203 corresponds to the second node in the present application.

Embodiment 3

Figure 3:
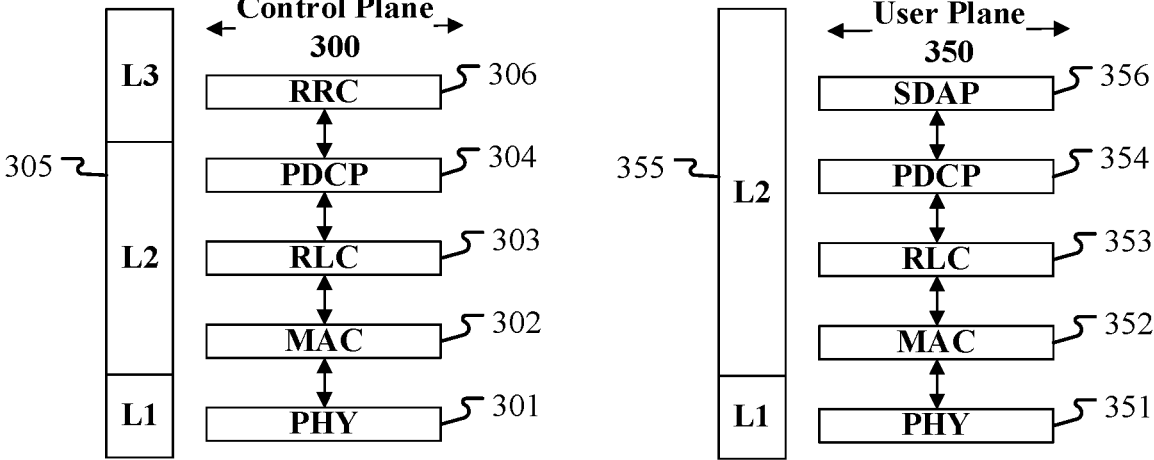
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the second information block in the present application is generated by the RRC sublayer 306.

In one embodiment, the second information block in the present application is generated by the MAC sublayer 302.

In one embodiment, the second information block in the present application is generated by the MAC sublayer 352.

In one embodiment, the second information block in the present application is generated by the PHY 301.

In one embodiment, the second information block in the present application is generated by the PHY 351.

In one embodiment, the first information block in the present application is generated by the PHY 301.

In one embodiment, the first information block in the present application is generated by the PHY 351.

In one embodiment, the third information block in the present application is generated by the RRC sublayer 306.

In one embodiment, the third information block in the present application is generated by the MAC sublayer 302.

In one embodiment, the third information block in the present application is generated by the MAC sublayer 352.

In one embodiment, the fourth information block in the present application is generated by the RRC sublayer 306.

In one embodiment, the fourth information block in the present application is generated by the MAC sublayer 302.

In one embodiment, the fourth information block in the present application is generated by the MAC sublayer 352.

In one embodiment, the first reference signal in the present application is generated by the PHY 301.

In one embodiment, the first reference signal in the present application is generated by the PHY 351.

In one embodiment, the first signal in the present application is generated by the PHY 301.

In one embodiment, the first signal in the present application is generated by the PHY 351.

In one embodiment, the M−1 signal(s) in the present application is(are) generated by the PHY 301.

In one embodiment, the M−1 signal(s) in the present application is(are) generated by the PHY 351.

In one embodiment, the M−1 signal information block(s) in the present application is(are) generated by the PHY 301.

In one embodiment, the M−1 signal information block(s) in the present application is(are) generated by the PHY 351.

In one embodiment, any of the M−1 information block(s) in the present application is(are) generated by the PHY 301 or the PHY 351 or the RRC sublayer 306 or the MAC sublayer 302 or the MAC sublayer 352.

Embodiment 4

Figure 4:
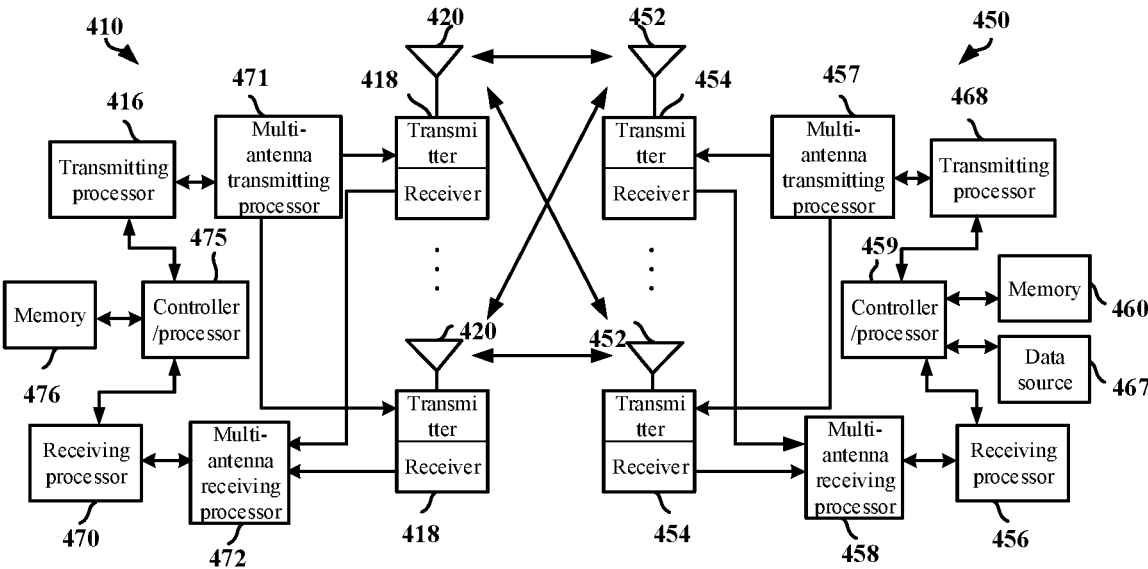
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 being in communications with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/ processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first information block and a second information block; receives a first reference signal; and receives a first signal; herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action comprises: receiving a first information block and a second information block; receiving a first reference signal; receiving a first signal; herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first information block and a second information block; transmits a first reference signal; transmits a first signal; herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action comprises: transmitting a first information block and a second information block; transmitting a first reference signal; and transmitting a first signal; herein, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one subembodiment of the above embodiment, the first communication device 410 corresponds to the second node in the present application.

In one embodiment, at least one of the antenna 452, the transmitter 454, the multi-antenna transmitting processor 458, the transmitting processor 468, the controller/processor 459, the memory 460, or the data sources 467 is used to transmit the fourth information block in the present application.

In one embodiment, at least one of the antenna 420, the receiver 418, the multi-antenna receiving processor 472, the receiving processor 470, the controller/processor 475, or the memory 476 is used to receive the fourth information block in the present application.

In one embodiment, at least one of the antenna 452, the receiver 454, the multi-antenna receiving processor 458, the receiving processor 456, the controller/processor 459, the memory 460, or the data source 467 is used to receive the third information block in the present application.

In one embodiment, at least one of the antenna 420, the transmitter 418, the multi-antenna transmitting processor 471, the transmitting processor 416, the controller/processor 475, or the memory 476 is used to transmit the third information block in the present application.

In one embodiment, at least one of the antenna 452, the receiver 454, the multi-antenna receiving processor 458, the receiving processor 456, the controller/processor 459, the memory 460, or the data source 467 is used to receive the first information block and the second information block in the present application.

In one embodiment, at least one of the antenna 420, the transmitter 418, the multi-antenna transmitting processor 471, the transmitting processor 416, the controller/processor 475, or the memory 476 is used to transmit the first information block and the second information block in the present application.

In one embodiment, at least one of the antenna 452, the receiver 454, the multi-antenna receiving processor 458, the receiving processor 456, the controller/processor 459, the memory 460, or the data source 467 is used to receive the M−1 information block(s) in the present application.

In one embodiment, at least one of the antenna 420, the transmitter 418, the multi-antenna transmitting processor 471, the transmitting processor 416, the controller/processor 475, or the memory 476 is used to transmit the M−1 information block(s) in the present application.

In one embodiment, at least one of the antenna 452, the receiver 454, the multi-antenna receiving processor 458, the receiving processor 456, the controller/processor 459, the memory 460, or the data source 467 is used to receive the first reference signal in the present application.

In one embodiment, at least one of the antenna 420, the transmitter 418, the multi-antenna transmitting processor 471, the transmitting processor 416, the controller/processor 475, or the memory 476 is used to transmit the first reference signal in the present application.

In one embodiment, at least one of the antenna 452, the receiver 454, the multi-antenna receiving processor 458, the receiving processor 456, the controller/processor 459, the memory 460, or the data source 467 is used to receive the first signal in the present application.

In one embodiment, at least one of the antenna 420, the transmitter 418, the multi-antenna transmitting processor 471, the transmitting processor 416, the controller/processor 475, or the memory 476 is used to transmit the first signal in the present application.

In one embodiment, at least one of the antenna 452, the receiver 454, the multi-antenna receiving processor 458, the receiving processor 456, the controller/processor 459, the memory 460, or the data source 467 is used to receive the M−1 signal(s) in the present application.

In one embodiment, at least one of the antenna 420, the transmitter 418, the multi-antenna transmitting processor 471, the transmitting processor 416, the controller/processor 475, or the memory 476 is used to transmit the M−1 signal(s) in the present application.

Embodiment 5

Figure 5:
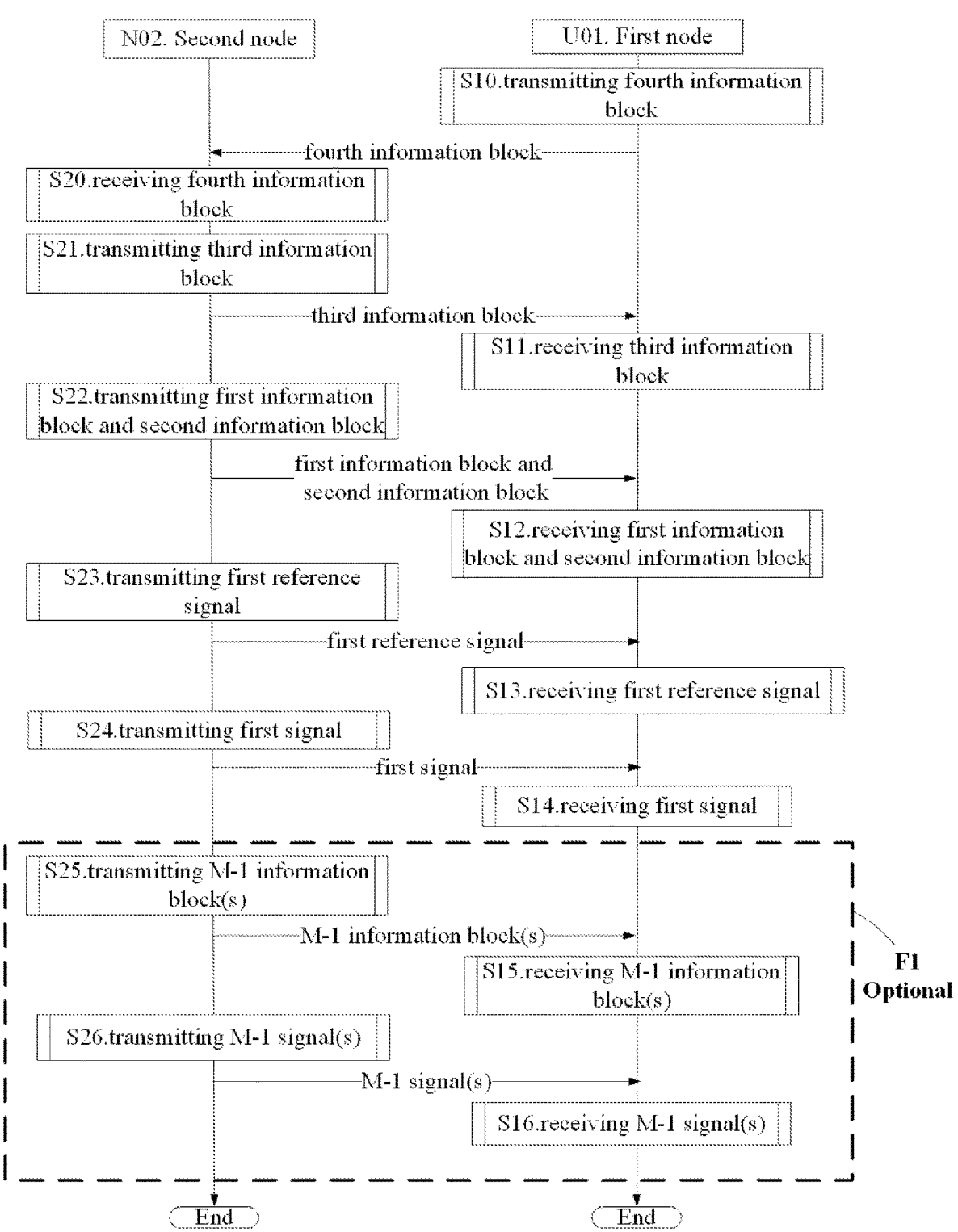
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5 a first node U01 and a second node N02 are in communications via an air interface. In FIG. 5, steps in box F1 are optional.

The first node U01 transmits a fourth information block in step S10; receives a third information block in step S11; receives a first information block and a second information block in step S12; receives a first reference signal in step S13; receives a first signal in step S14; receives M−1 information block(s) in step S15; and receives M−1 signal(s) in step S16.

The second node N02 receives a fourth information block in step S20; transmits a third information block in step S21; transmits a first information block and a second information block in step S22; transmits a first reference signal in step S23; transmits a first signal in step S24; transmits M−1 information block(s) in step S25; and transmits M−1 information block(s) in step S26.

In embodiment 5, the first information block is used to trigger a transmission of the first reference signal, a time interval between the first information block and the first reference signal is less than a first reference interval, and the first reference interval is a positive integer; the second information block is used by the first node U01 to determine the first signal; the first reference signal and the first signal comprise a same multi-carrier symbol in time domain; the second information block is used by the first node U01 to determine a first index, the first index is a non-negative integer, and the first index is used by the first node U01 to determine whether a QCL parameter for receiving the first reference signal is related to a QCL parameter for receiving the first signal; the first signal is any of M signals, the M−1 signal(s) is(are) signal(s) other than the first signal in the M signals, M being a positive integer greater than 1; there exists a same multi-carrier symbol belonging to time-domain resources occupied by the first reference signal and time-domain resources occupied by each of the M signals; the M information blocks comprise the M−1 information block(s) and the second information block, and the M information blocks are respectively used by the first node U01 to determine the M signals; the third information block is used to indicate N time-frequency resource groups, and each of the N time-frequency resource groups corresponds to an index in a first index set; time-frequency resources occupied by the second information block belong to a first time-frequency resource group in the N time-frequency resource groups, and the first index is an index corresponding to the first time-frequency resource group in the first index set; time-frequency resources occupied by the first information block belong to a target time-frequency resource group in the N time-frequency resource groups, and the target index is an index corresponding to the target time-frequency resource group in the first index set; N is a positive integer greater than 1, the first time-frequency resource group is one of the N time-frequency resource groups, the target time-frequency resource group is one of the N time-frequency resource groups, the first index set comprises multiple indexes, and any index in the first index set is a non-negative integer; the fourth information block is used by the second node N02 to determine the first reference interval.

In one embodiment, a method in the first node also comprises:

transmitting a fifth information block;

herein, the fifth information block is generated for a measurement performed on the first reference signal.

In one subembodiment of the above embodiment, the first reference signal comprises a CSI-RS, and the fifth information block comprises a CSI generated for a measurement performed on the first reference signal.

In one subembodiment of the above embodiment, the fifth information comprises UCI.

In one embodiment, a TCI state is used to indicate at least one QCL parameter.

In one embodiment, a TCI state is used to indicate a QCL parameter.

In one embodiment, a TCI state is used to indicate multiple QCL parameters.

In one embodiment, a TCI state indicates an index of a reference signal, and a QCL parameter of the reference signal is a QCL parameter indicated by the TCI state.

In one embodiment, a TCI state indicates an index of multiple reference signals, and QCL parameters respectively corresponding to the plurality of reference signals are multiple QCL parameters indicated by the TCI state.

In one embodiment, a TCI state indicates a reference signal, and a QCL parameter of the reference signal is a QCL parameter of indicated by the TCI state.

In one embodiment, a QCL parameter indicated by a TCI state is a QCL parameter of a reference signal indicated by the TCI state.

In one embodiment, a range of an index of a reference signal indicated by a TCI state comprises an index of a CSI-RS, an index of an SSB, and an index of a Sounding Reference Signal (SRS).

In one embodiment, a range of an index of a reference signal indicated by a TCI state comprises an index of a CSI-RS and an index of an SSB.

In one embodiment, a type of the QCL parameter comprises QCL-TypeD, and for the specific definition of the QCL-TypeD, refer to section 5.1.5 in 3GPP TS38.214.

In one embodiment, the QCL parameter comprises a Spatial Rx parameter.

In one embodiment, a method in the first node also comprises:

transmitting a sixth information block;

herein, the sixth information block is used to indicate whether the first signal is correctly received.

In one subembodiment of the above embodiment, the first signal is any of M signals, and the sixth information block is used to indicate whether the M signals are correctly received.

In one subembodiment of the above embodiment, the sixth information block comprises M information sub-blocks, the first signal is any of the M signals, and the M information sub-blocks are respectively used to indicate whether the M signals are correctly received.

In one subembodiment of the above embodiment, the sixth information block comprises UCI.

In one subembodiment of the above embodiment, the sixth information block comprises a Hybrid Automatic Repeat request-ACKnowledge (HARQ-ACK) of the first signal.

In one subembodiment of the above embodiment, the first signal is any of M signals, and the sixth information block comprises a HARQ-ACK of the M signals.

In one subembodiment of the above embodiment, the first signal is any of M signals, the sixth information block comprises M information sub-blocks, and the M information sub-blocks respectively comprise a HARQ-ACK of the M signals.

In one embodiment, M is equal to 2.

In one embodiment, M is greater than 2.

In one embodiment, the first reference signal and the M signals are non-orthogonal in time domain.

In one embodiment, the first reference signal and each of the M signals are overlapping in time domain.

In one embodiment, the first reference signal and each of the M signals comprise at least one same multi-carrier symbol in time domain.

In one embodiment, a multi-carrier symbol occupied by the first reference signal belongs to a multi-carrier symbol occupied by each of the M signals.

In one embodiment, the first reference signal and the M signals belong to a first frequency band in frequency domain.

In one embodiment, the second information block is one of the M information blocks used by the first node U01 to determine the first signal.

In one embodiment, the M information blocks are respectively carried by M different signalings.

In one embodiment, any of the M information blocks is carried by a physical-layer signaling.

In one embodiment, any of the M information blocks is carried by a DCI signaling.

In one embodiment, any of the M information blocks is carried by a physical-layer signaling or a higher-layer signaling.

In one embodiment, any of the M information blocks is carried by a DCI signaling or an RRC signaling.

In one embodiment, the third information block is semi-statically configured.

In one embodiment, the third information block is carried by a higher-layer signaling.

In one embodiment, the third information block is carried by an RRC signaling.

In one embodiment, the third information block is carried by a MAC CE signaling.

In one embodiment, the third information block comprises one or multiple IEs in an RRC signaling.

In one embodiment, the third information block comprises all or part of an IE of an RRC signaling.

In one embodiment, the third information block comprises partial fields of an IE in an RRC signaling.

In one embodiment, the third information block comprises multiple IEs of an RRC signaling.

In one embodiment, the third information block is transmitted on a downlink physical data channel (i.e., a downlink channel capable of carrying physical-layer data).

In one embodiment, the third information block comprises a ControlResource Set IE, and for the specific definition of the ControlResourceSet IE, refer to section 6.3.2 in 3GPP TS38.331.

In one embodiment, the third information block also indicates indexes in the first index set respectively corresponding to the N time-frequency resource groups.

In one embodiment, the N time-frequency resource groups are respectively N COntrol REsource SETs (CORESETs).

In one embodiment, the N time-frequency resource groups are respectively N search space sets.

In one embodiment, the first index set comprises a set of continuous non-negative integers.

In one embodiment, the first index set comprises 0 and 1.

In one embodiment, a number of index(es) comprised in the first index set is equal to M.

In one embodiment, the first index set comprises $0, 1, \ldots, M-1$.

In one embodiment, M is equal to 2, and the first index set comprises 0 and 1.

In one embodiment, an index in the first index set is CORESETPoolIndex, and for the specific definition of the CORESETPoolIndex, refer to section 6.3.2 in 3GPP TS38.331.

In one embodiment, the fourth information block is semi-statically configured.

In one embodiment, the fourth information block is carried by a higher-layer signaling.

In one embodiment, the fourth information block is carried by an RRC signaling.

In one embodiment, the fourth information block is carried by a MAC CE signaling.

In one embodiment, the fourth information block comprises one or multiple IEs in an RRC signaling.

In one embodiment, the fourth information block comprises all or partial an IE in an RRC signaling.

In one embodiment, the fourth information block comprises partial fields of an IE in an RRC signaling.

In one embodiment, the fourth information block comprises multiple IEs in an RRC signaling.

In one embodiment, the fourth information block is transmitted on an uplink physical layer data channel (that is, an uplink channel capable of carrying physical layer data).

In one embodiment, the uplink physical-layer data channel is a Physical Uplink Shared CHannel (PUSCH).

In one subembodiment, the uplink physical-layer data channel is a short PUSCH (sPUSCH).

In one embodiment, the uplink physical-layer data channel is a Narrow Band PUSCH (NB-PUSCH).

In one embodiment, the fourth information block belongs to a capability reporting of the first node.

In one embodiment, the fourth information block is used to indicate the first reference interval.

In one embodiment, the fourth information block explicitly indicates the first reference interval.

In one embodiment, the fourth information block implicitly indicates the first reference interval.

In one embodiment, the fourth information block indicates the first reference interval out of a first interval set.

In one subembodiment of the above embodiment, the first interval set comprises at least one interval value, any interval value comprised in the first interval set is a non-negative integer, and the first reference interval is an interval value in the first interval set.

In one subembodiment of the above embodiment, the first interval set comprises 14, 28 and 48.

In one embodiment, the fourth information block indicates a capability of the first node, and the capability of the first node corresponds to the first reference interval.

In one embodiment, the fourth information block indicates a capability of the first node out of the P capabilities, the P capabilities respectively correspond to P reference intervals, P being a positive integer greater than 1; the first reference interval is one of the P reference intervals corresponding to the capability of the first node.

In one embodiment, the fourth information block indicates a category of the first node, and the category of the first node corresponds to the first reference interval.

In one embodiment, the fourth information block indicates a category of the first node out of P categories, the P categories respectively correspond to P reference intervals, and P is a positive integer greater than 1; the first reference interval is one of the P reference intervals corresponding to the category of the first node.

Embodiment 6

Embodiment 6 illustrates a flowchart of radio signal transmission according to another embodiment of the present application, as shown in FIG. 6. In FIG. 6 a first node U03 and a second node N04 are in communications via an air interface. In FIG. 6, the dotted box F2 is optional.

The first node U03 transmits a fourth information block in step S30; receives a first information block and a second information block in step S31; receives a first reference signal in step S32; receives a first signal in step S33; receives M−1 signal(s) in step S34.

The second node N04 receives a fourth information block in step S40; transmits a first information block and a second information block in step S41; transmits a first reference signal in step S42; transmits a first signal in step S43; transmits M−1 signal(s) in step S44.

In embodiment 6, the first information block is used to trigger a transmission of the first reference signal, a time interval between the first information block and the first reference signal is less than a first reference interval, and the first reference interval is a positive integer; the second information block is used by the first node U03 to determine the first signal; the first reference signal and the first signal comprise a same multi-carrier symbol in time domain; the second information block is used by the first node U03 to determine a first index, the first index is a non-negative integer, and the first index is used by the first node U03 to determine whether a QCL parameter for receiving the first reference signal is related to a QCL parameter for receiving the first signal; the first signal is any of M signals, the M−1 signal(s) is(are) signal(s) other than the first signal in the M signals, M being a positive integer greater than 1; there exists a same multi-carrier symbol belonging to time-domain resources occupied by the first reference signal and time-domain resources occupied by each of the M signals; the second information block is used to indicate the M signals; M indexes respectively indicate QCL parameters for receiving the M signals, and the first index is one of the M indexes; a position of the first index in the M indexes is used by the first node U03 to determine whether the QCL parameter for receiving the first reference signal is related to the QCL parameter for receiving the first signal; the fourth information block is used by the second node N04 to determine the first reference interval.

In one embodiment, the second information block is carried by a DCI signaling.

In one embodiment, a second information block is used to indicate scheduling information of the M signals.

In one embodiment, the M signals occupy same time-frequency resources.

In one embodiment, the M signals occupy same time-domain resources.

In one embodiment, the M signals occupy a same multi-carrier symbol.

In one embodiment, the M signals all comprise data, and scheduling information of the M signals comprises at least one of occupied time-domain resources, occupied frequency-domain resources, an MCS, configuration information of DMRS, a HARQ process number, an RV, an NDI, a DAI, a transmitting antenna port or a TCI state.

In one embodiment, the M indexes indicate M TCI states.

In one embodiment, the M indexes are respectively indexes of M TCI states.

In one embodiment, the first index indicates a TCI state.

In one embodiment, the first index is an index of a TCI state.

In one embodiment, the first index is used to indicate the QCL parameter for receiving the first signal.

In one embodiment, a TCI state indicated by the first index is used to indicate a QCL parameter for receiving the first signal.

In one embodiment, a QCL parameter indicated by a TCI state indicated by the first index is used to receive the first signal.

In one embodiment, a QCL parameter indicated by a TCI state indicated by the first index is the same as a QCL parameter for receiving the first signal.

In one embodiment, a size relation between a time interval between the second information block and the first signal and a second reference interval is used by the first node U03 to determine the first index.

In one embodiment, a time interval between the second information block and the first signal is not less than the second reference interval, and the first index is indicated by the second information block.

In one embodiment, when a time interval between the second information block and the first signal is less than a second reference interval, the first index is not indicated by the second information block.

In one embodiment, the second information block comprises a first field, the first field comprised in the second information block is used to indicate a first TCI state group out of T TCI state groups, and T is a positive integer greater than 1; a size relation between a time interval between the second information block and the first signal and a second reference interval is used by the first node U03 to determine whether the first index is related to the first TCI state group.

In one subembodiment of the above embodiment, a size relation between a time interval between the second information block and the M signals and a second reference interval is used by the first node U03 to determine whether the M indexes are related to the first TCI state group.

In one subembodiment of the above embodiment, any of the T TCI state groups indicates at least one TCI state.

In one subembodiment of the above embodiment, the first TCI state group comprises M TCI States, and the M TCI states respectively correspond to the M signals.

In one subembodiment of the above embodiment, the first field comprised in the second information block is a Transmission configuration indication field.

In one subembodiment of the above embodiment, a number of bit(s) comprised in the first field comprised in the second information block is related to T.

In one subembodiment of the above embodiment, T is equal to 8, and a number of bit(s) comprised in the first field comprised in the second information block is equal to 3.

In one subembodiment of the above embodiment, a time interval between the second information block and the first signal is not less than the second reference interval, and the first TCI state group indicates the first index.

In one subembodiment of the above embodiment, a time interval between the second information block and the first signal is not less than the second reference interval, and the first TCI state group indicates the M indexes.

In one subembodiment of the above embodiment, a time interval between the second information block and the first signal is less than the second reference interval, and the first index is unrelated to the first field comprised in the second information block.

In one subembodiment of the above embodiment, a time interval between the second information block and the first signal is less than the second reference interval, and the M indexes are unrelated to the first field comprised in the second information block.

In one subembodiment of the above embodiment, a time interval between the second information block and the first signal is less than the second reference interval, and a number of TCI state(s) respectively comprised in the T TCI state groups is used by the first node U03 to determine the first index.

In one subembodiment of the above embodiment, a time interval between the second information block and the first signal is less than the second reference interval, and a number of TCI state(s) respectively comprised in the T TCI state groups is used by the first node U03 to determine the M indexes.

In one subembodiment of the above embodiment, a time interval between the second information block and the first signal is less than the second reference interval, and whether there exists a TCI state group comprising multiple TCI states in the T TCI state groups is used by the first node U03 to determine the first index.

In one subembodiment of the above embodiment, a time interval between the second information block and the first signal is less than the second reference interval, and whether there exists a TCI state group comprising multiple TCI states in the T TCI state groups is used by the first node U03 to determine the M indexes.

In one subembodiment of the above embodiment, a time interval between the second information block and the first signal is less than the second reference interval, whether there exists one of the T TCI state groups satisfying a third condition is used by the first node U03 to determine the M indexes, and the third condition comprises that a number of comprised TCI state(s) is equal to the M.

In one subembodiment of the above embodiment, the T TCI state groups respectively correspond to T code-points, and the T code-points are 0, 1, . . . , T−1 respectively; a time interval between the second information block and the first signal is less than the second reference interval, there exists a number of TCI states comprised in one of the T TCI state groups being equal to the M, a second TCI state group is one of the T TCI state groups with a lowest code-point satisfying a third condition, the second TCI state group indicates the M indexes, and the third condition comprises that a number of comprised TCI state(s) is equal to the M.

In one subembodiment of the above embodiment, a time interval between the second information block and the first signal is less than the second reference interval, there does not exist a number of TCI states comprised in one of the T TCI state groups being equal to the M, and the M indexes are unrelated to the T TCI state groups.

In one subembodiment of the above embodiment, a time interval between the second information block and the first signal is less than the second reference interval, there does not exist a number of TCI states comprised in one of the T TCI state groups being equal to the M, a first TCI state group indicates the M indexes, the N time-frequency resource groups respectively correspond to N TCI state groups, the first TCI state group is one of the N TCI state groups corresponding to a second target time-frequency resource group, and the second target time-frequency resource group is a time-frequency resource group with a lowest index in the N time-frequency resource group; any of the N TCI state groups comprises at least one TCI state.

In one subembodiment of the above embodiment, a time interval between the second information block and the first signal is less than the second reference interval, there does not exist a number of TCI states comprised in one of the T TCI state groups being equal to the M, a first TCI state group indicates the M indexes, the N time-frequency resource groups respectively correspond to N TCI state groups, the first TCI state group is one of the N TCI state groups corresponding to a second target time-frequency resource group, and the second target time-frequency resource group is one of the N time-frequency resource group satisfying a third condition, and the third condition comprises that a number of comprised TCI states is equal to the M; any of the N TCI state groups comprises at least one TCI state.

In one subembodiment of the above embodiment, a time interval between the second information block and the first signal is less than the second reference interval, there does not exist a number of TCI states comprised in one of the T TCI state groups being equal to the M, a first TCI state group indicates the M indexes, the N time-frequency resource groups respectively correspond to N TCI states, the first TCI state group comprises TCI state group(s) respectively corresponding to M time-frequency resource groups in the N TCI states, and the M time-frequency resource groups are M time-frequency resource groups with lowest indexes in the N time-frequency resource groups.

Embodiment 7

Embodiment 7 illustrates a schematic diagram of a relation between a first index and a QCL parameter for receiving a first reference signal according to one embodiment of the present application, as shown in FIG. 7.

In embodiment 7, the first information block in the present application is used to determine a target index, and the target index is a non-negative integer; the second information block in the present application is used to determine a first index, and the first index is a non-negative integer; whether the target index is the same as the first index is used to determine whether the QCL parameter for receiving the first reference signal is related to the QCL parameter for receiving the first signal in the present application.

In one embodiment, time-frequency resources occupied by the second information block are used to determine a first index.

In one embodiment, time-frequency resources occupied by the first information block are used to determine a target index.

Embodiment 8

Figure 8:
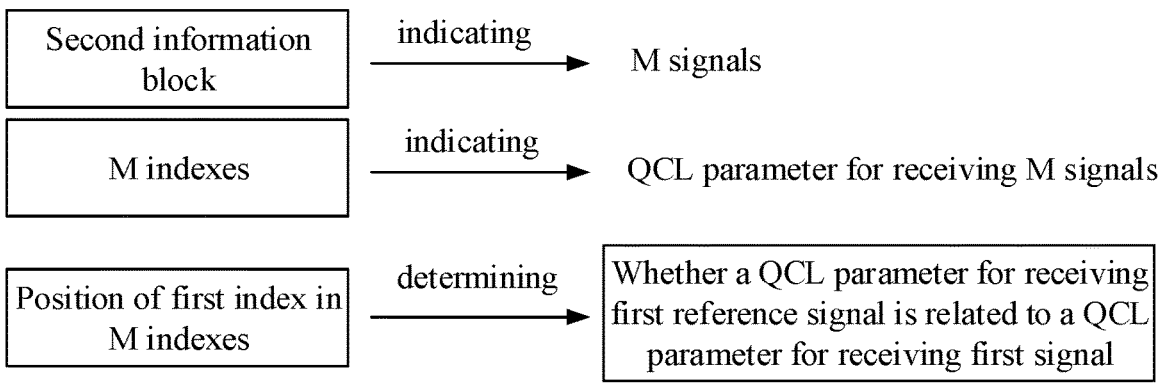
FIG. 8 illustrates a schematic diagram of a relation between a first index and a QCL parameter for receiving a first reference signal according to another embodiment of the present application.

Embodiment 8 illustrates a schematic diagram of a relation between a first index and a QCL parameter for receiving a first reference signal according to another embodiment of the present application, as shown in FIG. 8.

In embodiment 8, the second information block in the present application is used to indicate the M signals in the present application; M indexes respectively indicate QCL parameters for receiving the M signals, and the first index in the present application is one of the M indexes; a position of the first index in the M indexes is used to determine whether the QCL parameter for receiving the first reference signal is related to the QCL parameter for receiving the first signal in the present application.

Embodiment 9

Figure 9:
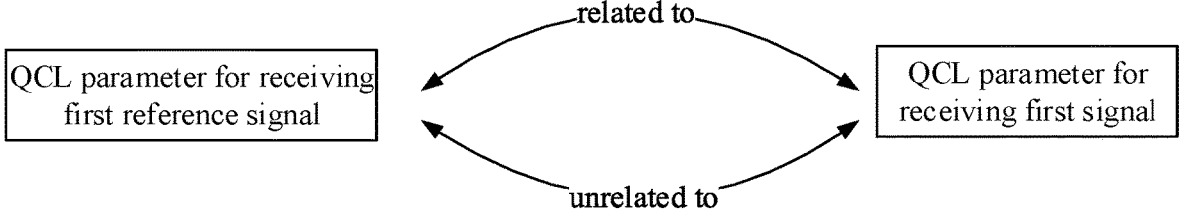
FIG. 9 illustrates a schematic diagram of relations among a target index, a first index and a QCL parameter of a first reference signal according to one embodiment of the present application.

Embodiment 9 illustrates a schematic diagram of relations among a target index, a first index and a QCL parameter of a first reference signal according to one embodiment of the present application, as shown in FIG. 9.

In embodiment 9, when the target index is the same as the first index, the QCL parameter for receiving the first reference signal is related to the QCL parameter for receiving the first signal in the present application; when the target index is different from the first index, the QCL parameter for receiving the first reference signal is unrelated to the QCL parameter for receiving the first signal.

Embodiment 10

Figure 10:
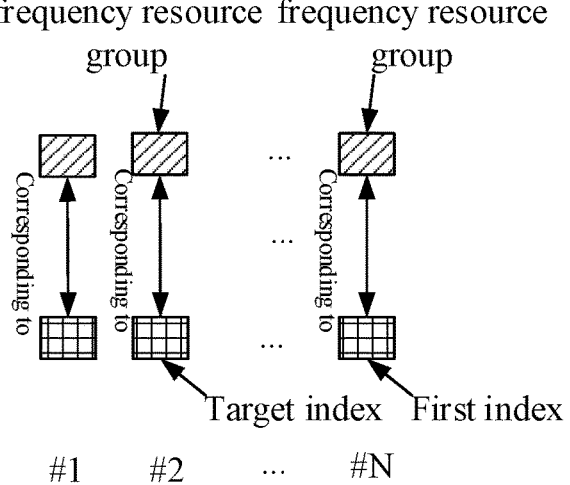
FIG. 10 illustrates a schematic diagram of a target index and a first index according to one embodiment of the present application.

Embodiment 10 illustrates a schematic diagram of a target index and a first index according to one embodiment of the present application, as shown in FIG. 10.

In embodiment 10, each of the N time-frequency resource groups in the present application corresponds to an index in a first index set; time-frequency resources occupied by the second information block in the present application belong to a first time-frequency resource group in the N time-frequency resource groups, and the first index is an index corresponding to the first time-frequency resource group in the first index set; time-frequency resources occupied by the first information block in the present application belong to a target time-frequency resource group in the N time-frequency resource groups, and the target index is an index corresponding to the target time-frequency resource group in the first index set; N is a positive integer greater than 1, the first time-frequency resource group is one of the N time-frequency resource groups, the target time-frequency resource group is one of the N time-frequency resource groups, the first index set comprises multiple indexes, and any index in the first index set is a non-negative integer.

In one embodiment, when the target index is the same as the first index, the QCL parameter for receiving the first reference signal is related to the QCL parameter for receiving the first signal; when the target index is different from the first index, a target TCI state is used to indicate the QCL parameter for receiving the first reference signal; the N time-frequency resource groups respectively correspond to N TCI states, the target TCI state is one of the N TCI states corresponding to the first target time-frequency resource group, the first target time-frequency resource group is a time-frequency resource group with a lowest index satisfying a first condition in the N time-frequency resource groups, and the first condition comprises that the corresponding index in the first index set is the same as the target index.

In one embodiment, the first signal is any of the M signals in the present application; M indexes are respectively indexes corresponding to time-frequency resources occupied by the M information blocks in the first index set, and the first index is one of M indexes corresponding to the second information block; the target index is the same as a first given index in the M indexes, the first given index corresponds to a first given information block in the M information blocks, the first given information block is used to determine a first given signal in the M signals, and the QCL parameter for receiving the first reference signal is related to a QCL parameter for receiving the first given signal.

In one subembodiment of the above embodiment, each two of the M indexes are different from each other.

In one subembodiment of the above embodiment, M is equal to 2, and the M indexes are different.

In one subembodiment of the above embodiment, the first given index is the same as the first index.

In one subembodiment of the above embodiment, the first given index is different from the first index.

In one embodiment, the first signal comprises a periodic CSI-RS, the second information block is carried by an RRC signaling, and the second information block indicates the QCL parameter for receiving the first signal.

In one embodiment, the first signal comprises a semi-persistent CSI-RS, the second information block is carried by an RRC signaling, and the second information block indicates the QCL parameter for receiving the first signal.

In one embodiment, the second information block is carried by a DCI signaling, and a size relation between a time interval between the second information block and the first signal and a second reference interval is used to determine the QCL parameter for receiving the first signal.

In one subembodiment of the above embodiment, the time interval between the second information block and the first signal is less than the second reference interval, a first TCI state is used to indicate the QCL parameter for receiving the first signal, the N time-frequency resource groups respectively correspond to N TCI states, the first TCI state is one of the N TCI states corresponding to the third target time-frequency resource group, the third target time-frequency resource group is a time-frequency resource group with a lowest index satisfying a second condition in the N time-frequency resource groups, and the second condition comprises that each of index(es) in its corresponding the first index set is the same as the first index.

In one subembodiment of the above embodiment, a time interval between the second information block and the first signal is not less than the second reference interval, and the QCL parameter for receiving the first signal is indicated by the second information block.

In one subembodiment of the above embodiment, a time interval between the second information block and the first signal is not less than the second reference interval, the first signal comprises data, the second information block comprises a Transmission configuration indication field, and the QCL parameter for receiving the first signal is indicated by the Transmission configuration indication field comprised in the second information block.

In one subembodiment of the above embodiment, a time interval between the second information block and the first signal is not less than the second reference interval, the first signal comprises a CSI-RS, the QCL parameter of the first signal is indicated by configuration information of the first signal, and configuration information of the first signal is configured by an RRC signaling.

Embodiment 11

Embodiment 11 illustrates a schematic diagram of a relation between a position of a first index in M indexes and a QCL parameter for receiving a first reference signal according to one embodiment of the present application, as shown in FIG. 11.

In embodiment 11, when the position of the first index in the M indexes is a first position, the QCL parameter for receiving the first reference signal is related to the QCL parameter for receiving the first signal; when the position of the first index in the M indexes is not the first position, the QCL parameter for receiving the first reference signal is unrelated to the QCL parameter for receiving the first signal.

In one embodiment, the first position is a first one of the M indexes.

In one embodiment, the first position is an m-th one of the M indexes.

In one embodiment, the M indexes are arranged in order, a given index is any of the M indexes, the given index is a k-th index in the M indexes, K is a positive integer not greater than the M, and a position of the given index in the M indexes is the k.

In one embodiment, the first index is a first index in the M indexes, and the QCL parameter for receiving the first reference signal is related to the QCL parameter for receiving the first signal.

In one embodiment, the first index is not a first index in the M indexes, and the QCL parameter for receiving the first reference signal is unrelated to the QCL parameter for receiving the first signal.

Embodiment 12

Embodiment 12 illustrates a structure block diagram of a processing device in a first node, as shown in FIG. 12. In FIG. 12, a processing device 1200 in a first node is comprised of a first receiver 1201 and a first transmitter 1202.

In one embodiment, the first node 1200 is a UE.

In one embodiment, the first node 1200 is a relay node.

In one embodiment, the first node 1200 is a vehicle-mounted communication device.

In one embodiment, the first node 1200 is a UE that supports V2X communications.

In one embodiment, the first node 1200 is a relay node that supports V2X communications.

In one embodiment, the first receiver 1201 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201 comprises at least the first five of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201 comprises at least the first four of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201 comprises at least the first three of the antenna 452, the receiver 454, the multi-antenna receiving processor 458, the receiving processor 456, the controller/processor 459, the memory 460 or the data source 467 in FIG. 4 of the present application.

In one embodiment, the first receiver 1201 comprises at least the first two of the antenna 452, the receiver 454, the multi-antenna receiving processor 458, the receiving processor 456, the controller/processor 459, the memory 460 or the data source 467 in FIG. 4 of the present application.

In one embodiment, the first transmitter 1202 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202 comprises at least first five the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202 comprises at least first four the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202 comprises at least first three the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1202 comprises at least first two the antenna 452, the transmitter 454, the multi-antenna transmitting processor 457, the transmitting processor 468, the controller/processor 459, the memory 460, or the data source 467 in FIG. 4 of the present application.

The first receiver 1201 receives a first information block and a second information block; receives a first reference signal; and receives a first signal;

In embodiment 12, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one embodiment, the first receiver 1201 also receives M−1 signal(s); herein, the first signal is any of M signals, the M−1 signal(s) is(are) signal(s) other than the first signal in the M signals, M being a positive integer greater than 1; there exists a same multi-carrier symbol belonging to time-domain resources occupied by the first reference signal and time-domain resources occupied by each of the M signals.

In one embodiment, the first receiver 1201 also receives M−1 information block(s); herein, M information blocks comprise the M−1 information block(s) and the second information block, and the M information blocks are respectively used to determine the M signals.

In one embodiment, the first information block is used to determine a target index, and the target index is a non-negative integer; whether the target index is the same as the first index is used to determine whether the QCL parameter for receiving the first reference signal is related to the QCL parameter for receiving the first signal.

In one embodiment, the first receiver 1201 also receives a third information block; herein, the third information block is used to indicate N time-frequency resource groups, and each of the N time-frequency resource groups corresponds to an index in a first index set; time-frequency resources occupied by the second information block belong to a first time-frequency resource group in the N time-frequency resource groups, and the first index is an index corresponding to the first time-frequency resource group in the first index set; time-frequency resources occupied by the first information block belong to a target time-frequency resource group in the N time-frequency resource groups, and the target index is an index corresponding to the target time-frequency resource group in the first index set; N is a positive integer greater than 1, the first time-frequency resource group is one of the N time-frequency resource groups, the target time-frequency resource group is one of the N time-frequency resource groups, the first index set comprises multiple indexes, and any index in the first index set is a non-negative integer.

In one embodiment, the second information block is used to indicate the M signals; M indexes respectively indicate QCL parameters for receiving the M signals, and the first index is one of the M indexes; a position of the first index in the M indexes is used to determine whether the QCL parameter for receiving the first reference signal is related to the QCL parameter for receiving the first signal.

In one embodiment, the first node further comprises:

the first transmitter 1202, transmitting a fourth information block;

herein, the fourth information block is used to determine the first reference interval.

Embodiment 13

Embodiment 13 illustrates a structure block diagram of a processing device in a second node, as shown in FIG. 13. In FIG. 13, a processing device 1300 in the second node is comprised of a second transmitter 1301 and a second receiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1301 comprises at least the first five of the antenna 420, the transmitter 418, the multi-antenna transmitting processor 471, the transmitting processor 416, the controller/processor 475 or the memory 476 in FIG. 4 of the present application.

In one embodiment, the second transmitter 1301 comprises at least the first four of the antenna 420, the transmitter 418, the multi-antenna transmitting processor 471, the transmitting processor 416, the controller/processor 475 or the memory 476 in FIG. 4 of the present application.

In one embodiment, the second transmitter 1301 comprises at least the first three of the antenna 420, the transmitter 418, the multi-antenna transmitting processor 471, the transmitting processor 416, the controller/processor 475 or the memory 476 in FIG. 4 of the present application.

In one embodiment, the second transmitter 1301 comprises at least the first two of the antenna 420, the transmitter 418, the multi-antenna transmitting processor 471, the transmitting processor 416, the controller/processor 475 or the memory 476 in FIG. 4 of the present application.

In one embodiment, the second receiver 1302 comprises at least one of the antenna 420, the receiver 418, the multi-antenna receiving processor 472, the receiving processor 470, the controller/processor 475 or the memory 476 in FIG. 4 of the present application.

In one embodiment, the second receiver 1302 comprises at least first five of the antenna 420, the receiver 418, the multi-antenna receiving processor 472, the receiving processor 470, the controller/processor 475 or the memory 476 in FIG. 4 of the present application.

In one embodiment, the second receiver 1302 comprises at least first four of the antenna 420, the receiver 418, the multi-antenna receiving processor 472, the receiving processor 470, the controller/processor 475 or the memory 476 in FIG. 4 of the present application.

In one embodiment, the second receiver 1302 comprises at least first three of the antenna 420, the receiver 418, the multi-antenna receiving processor 472, the receiving processor 470, the controller/processor 475 or the memory 476 in FIG. 4 of the present application.

In one embodiment, the second receiver 1302 comprises at least first two of the antenna 420, the receiver 418, the multi-antenna receiving processor 472, the receiving processor 470, the controller/processor 475 or the memory 476 in FIG. 4 of the present application.

The second transmitter 1301: transmits a first information block and a second information block; transmits a first reference signal; and transmits a first signal.

In embodiment 13, the first information block is used to trigger a transmission of the first reference signal, a time interval between the first information block and the first reference signal is less than a first reference interval, and the first reference interval is a positive integer; the second information block is used to determine the first signal; the first reference signal and the first signal comprise a same multi-carrier symbol in time domain; the second information block is used to determine a first index, the first index is a non-negative integer, and the first index is used to determine whether a QCL parameter for receiving the first reference signal is related to a QCL parameter for receiving the first signal.

In one embodiment, the second transmitter 1301 also transmits M−1 signal(s); herein, the first signal is any of M signals, the M−1 signal(s) is(are) signal(s) other than the first signal in the M signals, M being a positive integer greater than 1; there exists a same multi-carrier symbol belonging to time-domain resources occupied by the first reference signal and time-domain resources occupied by each of the M signals.

In one embodiment, the second transmitter 1301 also transmits M−1 information block(s); herein, M information blocks comprise the M−1 information block(s) and the second information block, and the M information blocks are respectively used to determine the M signals.

In one embodiment, the first information block is used to determine a target index, and the target index is a non-negative integer; whether the target index is the same as the first index is used to determine whether the QCL parameter for receiving the first reference signal is related to the QCL parameter for receiving the first signal.

In one embodiment, the second transmitter 1301 also transmits a third information block; herein, the third information block is used to indicate N time-frequency resource groups, and each of the N time-frequency resource groups corresponds to an index in a first index set; time-frequency resources occupied by the second information block belong to a first time-frequency resource group in the N time-frequency resource groups, and the first index is an index corresponding to the first time-frequency resource group in the first index set; time-frequency resources occupied by the first information block belong to a target time-frequency resource group in the N time-frequency resource groups, and the target index is an index corresponding to the target time-frequency resource group in the first index set; N is a positive integer greater than 1, the first time-frequency resource group is one of the N time-frequency resource groups, the target time-frequency resource group is one of the N time-frequency resource groups, the first index set comprises multiple indexes, and any index in the first index set is a non-negative integer.

In one embodiment, the second information block is used to indicate the M signals; M indexes respectively indicate QCL parameters for receiving the M signals, and the first index is one of the M indexes; a position of the first index in the M indexes is used to determine whether the QCL parameter for receiving the first reference signal is related to the QCL parameter for receiving the first signal.

In one embodiment, the second node comprises:

the second receiver 1302, receiving a fourth information block;

herein, the fourth information block is used to determine the first reference interval.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The second node in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, tele-controlled aircrafts and other wireless communication devices. The UE or terminal in the present application includes but is not limited to mobile phones, tablet computers, notebooks, network cards, low-consumption equipment, eMTC terminals, NB-IOT terminals, vehicle-mounted communication equipment, aircrafts, diminutive airplanes, unmanned aerial vehicles, tele-controlled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A node for wireless communications, comprising:
a transmitter/receiver, and
a processor, wherein the transmitter/receiver and the processor are configured to:
receive a first information block;
receive a second information block;
receive a first reference signal, wherein the first information block includes information related to triggering transmission of the first reference signal; and
receive a first signal, wherein a time interval between receiving the first information block and receiving the first reference signal is less than a first reference interval, the second information block is used to determine receiving the first signal, the first reference signal and the first signal comprise at least one same multi-carrier symbol in a time domain, the second information block is used to determine a first index, and the first index is used to determine whether a Quasi Co-Location (QCL) parameter for receiving the first reference signal is related to a QCL parameter for receiving the first signal.

2. The node of claim 1, wherein the first information block comprises a channel state information (CSI) request field, and wherein the first information block is used to determine a first CSI triggering state and the first reference signal is associated with the first CSI triggering state.

3. The node of claim 1, wherein the second information block is carried by downlink control information (DCI) signaling.

4. The node of claim 1, wherein the first reference signal comprises an aperiodic channel state information reference signal (CSI-RS).

5. The node of claim 1, wherein the first signal comprises a downlink signal received on a physical downlink control channel (PDSCH).

6. The node of claim 1, wherein the first reference interval is a beam Switch Timing.

7. The node of claim 1, wherein the first index is a CORESETPoolIndex.

8. The node of claim 1, wherein the QCL parameter for receiving the first reference signal comprises a QCL assumption.

9. The node of claim 1 configured as a User Equipment (UE).

10. The node of claim 1, wherein the first information block, the second information block, the first reference signal, and the first signal are received from a second node configured as an NR node B (gNB).

11. A method in a node for wireless communications, comprising:
receiving a first information block;
a second information block;
receiving a first reference signal, wherein the first information block includes information related triggering transmission of the first reference signal; and receiving a first signal, wherein a time interval between receiving the first information block and receiving the first reference signal is less than a first reference interval, the second information block is used to determine receiving the first signal, the first reference signal and the first signal comprise at least one same multi-carrier symbol in a time domain, the second information block is used to determine a first index, and the first index is used to determine whether a Quasi Co-Location (QCL) parameter for receiving the first reference signal is related to a QCL parameter for receiving the first signal.

12. The method of claim 11, wherein the first information block comprises a channel state information (CSI) request field, and wherein the first information block is used to determine a first CSI triggering state and the first reference signal is associated with the first CSI triggering state.

13. The method of claim 11, wherein the second information block is carried by downlink control information (DCI) signaling.

14. The method of claim 11, wherein the first reference signal comprises an aperiodic channel state information reference signal (CSI-RS).

15. The method of claim 11, wherein the first signal comprises a downlink signal received on a physical downlink control channel (PDSCH).

16. The method of claim 11, wherein the first reference interval is a beam Switch Timing.

17. The method of claim 11, wherein the first index is a CORESETPoolIndex.

18. The method of claim 11, wherein the QCL parameter for receiving the first reference signal comprises a QCL assumption.

19. The method of claim 11, wherein the node is configured as a User Equipment (UE).

20. The method of claim 11, wherein the first information block, the second information block, the first reference signal, and the first signal are received from a second node configured as an NR node B (gNB).

\* \* \* \* \*